(12) United States Patent
Suh

(10) Patent No.: US 11,609,793 B2
(45) Date of Patent: Mar. 21, 2023

(54) ELECTRONIC APPARATUS DETERMINING GPUS IN A NETWORK FOR EFFECTIVE DATA LEARNING AND METHOD FOR CONTROLLING THEREOF

(71) Applicant: SAMSUNG ELECTRONICS CO., LTD., Suwon-si (KR)

(72) Inventor: Dongeun Suh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 16/992,887

(22) Filed: Aug. 13, 2020

(65) Prior Publication Data

US 2021/0049042 A1 Feb. 18, 2021

(30) Foreign Application Priority Data

Aug. 16, 2019 (KR) .......................... 10-2019-0100171

(51) Int. Cl.
  *G06F 9/50* (2006.01)
  *G06T 1/20* (2006.01)
  *G06N 20/00* (2019.01)
(52) U.S. Cl.
  CPC ............ *G06F 9/505* (2013.01); *G06F 9/5044* (2013.01); *G06N 20/00* (2019.01); *G06T 1/20* (2013.01)
(58) Field of Classification Search
  CPC .. G06F 9/505; G06F 9/5044; G06F 2209/501; G06F 9/5066; G06F 9/5055;
  (Continued)

(56) References Cited

U.S. PATENT DOCUMENTS 9,396,033 B2 7/2016 Lee et al.
10,142,195 B1 11/2018 Sledz et al.
(Continued)

FOREIGN PATENT DOCUMENTS

CN 106959891 A 7/2017
CN 107135257 A 9/2017
(Continued)

OTHER PUBLICATIONS

Written Opinion (PCT/ISA/237) issued by the International Searching Authority in corresponding International Application No. PCT/KR2020/010828, dated Nov. 11, 2020.
(Continued)

*Primary Examiner* — Jorge A Chu Joy-Davila
(74) *Attorney, Agent, or Firm* — Sughrue Mion, PLLC

(57) ABSTRACT

An electronic apparatus includes a communication interface to communicate with external servers; and a processor to control the electronic apparatus by executing at least one instruction. The processor is configured to receive, from each of the external servers, values of bandwidths of a plurality of GPU pairs into which a plurality of GPUs included in the external servers are combined and information on whether the plurality of GPUs are used, based on a input job related to machine learning being received, identify a number of GPUs and a bandwidth value that are required for performing tasks included in the input job, and determine GPUs among the plurality of GPUs to perform the tasks based on the values of the bandwidths of the plurality of GPU pairs, the received information on whether the plurality of GPUs are used, and the number of GPUs and the bandwidth value.

16 Claims, 10 Drawing Sheets

(58) Field of Classification Search
CPC ......... G06F 9/5077; G06N 20/00; G06T 1/20; G06T 2200/28

See application file for complete search history.

(56) References Cited

U.S. PATENT DOCUMENTS

| | | | |
|---|---|---|---|
| 10,325,343 B1* | 6/2019 | Zhao | G06F 9/5061 |
| 2010/0235845 A1 | 9/2010 | Bates et al. | |
| 2012/0331275 A1 | 12/2012 | Mathieson et al. | |
| 2015/0242234 A1 | 8/2015 | Harris et al. | |
| 2016/0306673 A1* | 10/2016 | You | G06F 9/5044 |
| 2018/0276044 A1 | 9/2018 | Fong et al. | |
| 2019/0102169 A1 | 4/2019 | Yamazaki et al. | |
| 2019/0188560 A1* | 6/2019 | Le | G06T 1/20 |
| 2019/0324856 A1* | 10/2019 | Zhao | G06T 1/20 |
| 2020/0092392 A1* | 3/2020 | Seelam | G06N 3/08 |

FOREIGN PATENT DOCUMENTS

| | | |
|---|---|---|
| CN | 109033001 A | 12/2018 |
| CN | 109933430 A | 6/2019 |
| CN | 109992407 A | 7/2019 |
| JP | 2006338264 A | 12/2006 |
| KR | 101594915 B1 | 2/2016 |

OTHER PUBLICATIONS

International Search Report (PCT/ISA/210), issued by International Searching Authority in corresponding International Application No. PCT/KR2020/010828, dated Nov. 11, 2020.

Amaral, M., et al., "Topology-Aware GPU Scheduling for Learning Workloads in Cloud Environments", SC17, Nov. 12-17, 2017, Denver, Co., 12 pages.

Ren, Y., et al., "iRDMA: Efficient Use of RDMA in Distributed Deep Learning Systems", 2017 IEEE 19th International Conference on High Performance Computing and Communications; IEEE 15th International Conference on Smart City; IEEE 3rd International Conference on Data Science and Systems, pp. 231-238.

Woolley, C., "NCCL: Accelerated Multi-GPU Collective Communications", Jun. 5, 2019, pp. 1-56, https://images.nvidia.com/events/sc15/pdfs/NCCL-Woolley.pdf.

Sergeev, A., et al., "Meet Horovod: Uber's Open Source Distributed Deep Learning Framework for TensorFlow", Oct. 17, 2017, pp. 1-11, https://eng.uber.com/horovod/.

European Search Report dated Aug. 1, 2022 by the European Patent Office for European Patent Application No. 20853861.1.

Tallent Nathan R et al: "Evaluating On-Node GPU Interconnects for Deep Learning Workloads", Dec. 23, 2017 (Dec. 23, 2017), SAT 2015 18th International Conference, Austin, TX, USA, Sep. 24-27, 2015; [Lecture Notes in Computer Science; Lect.Notes Computer], Springer, Berlin, Heidelberg, pp. 3-21, XP047459187, ISBN: 978-3-540-74549-5.

* cited by examiner

FIG. 4

| Inter-GPU Comm. Type | Link Capacity (Mbps) |
|---|---|
| Ethernet type A (inter-node) | E1 Mbps |
| Ethernet type B (inter-node) | E2 Mbps |
| Infiniband type A (inter-node) | B1 Mbps |
| Infiniband type B (inter-node) | B2 Mbps |
| PCI-e (intra-node) | P Mbps |
| NVLink (intra-node) | N Mbps |
| ... | ... |

FIG. 5

```
kind: DMLJob
metadata:
   name: tf-horovod-bw-aware-16
   spec:
      gpus: 16
      interGPUbandwidth: 1000Mbps
      besteffortallowed: false
      template:
         spec:
            containers:
               - image: tf-cudnn:latest
               - name: tf-horovod-bw-aware
```

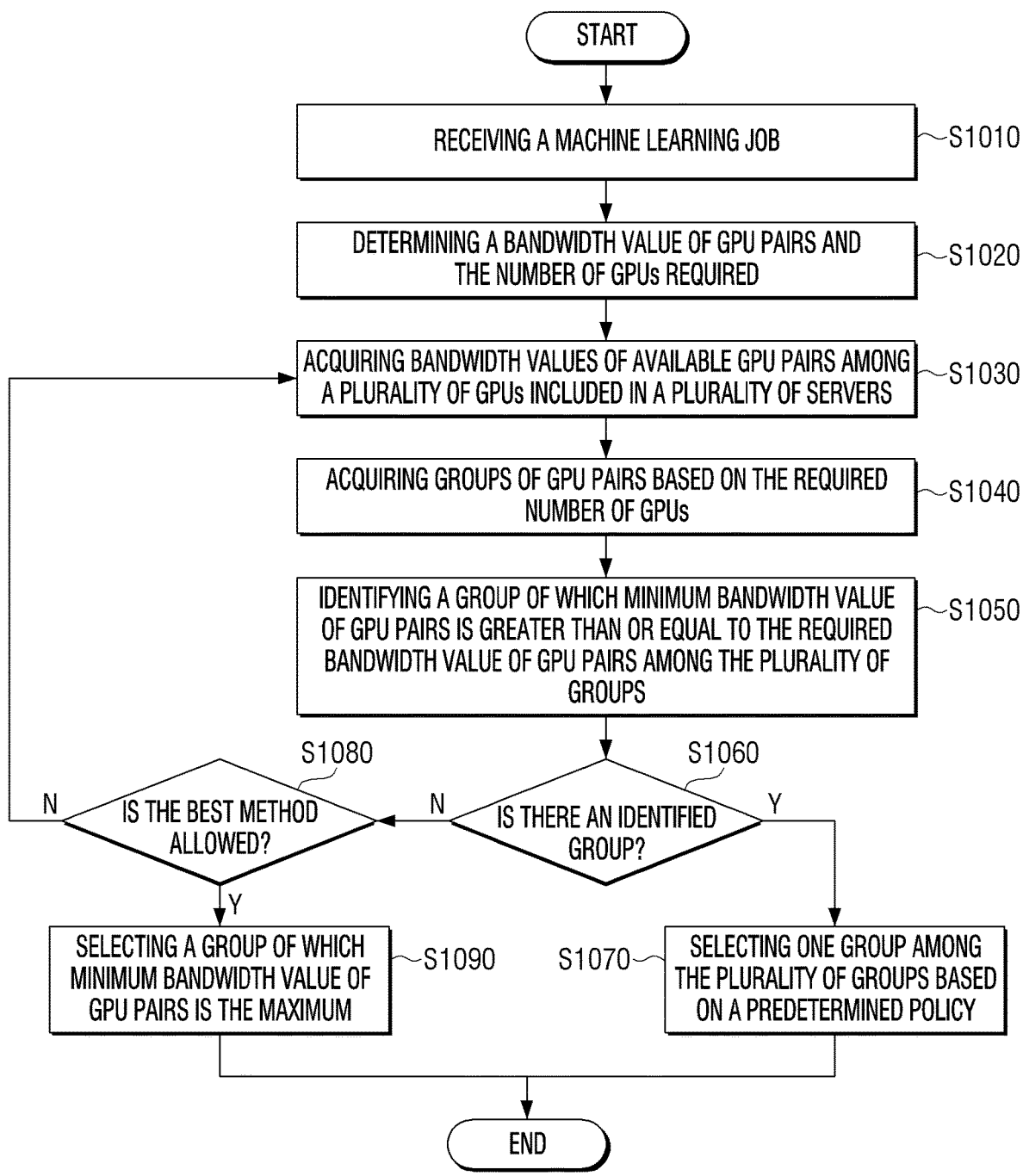

ELECTRONIC APPARATUS DETERMINING GPUS IN A NETWORK FOR EFFECTIVE DATA LEARNING AND METHOD FOR CONTROLLING THEREOF

CROSS-REFERENCE TO RELATED APPLICATION(S)

This application is based on and claims priority under 35 U.S.C. § 119(a) to Korean Patent Application No. 10-2019-0100171, filed on Aug. 16, 2019, in the Korean Intellectual Property Office, the disclosure of which is incorporated by reference herein in its entirety.

BACKGROUND

1. Field

The disclosure relates to an electronic apparatus and a method for controlling thereof, and more particularly, to an electronic apparatus determining graphics processing units (GPUs) in a network for effective data learning, and a method for controlling thereof.

2. Description of Related Art

Recently, artificial intelligence systems are being used in various fields. In an artificial intelligence system, a machine learns, determines, and becomes smarter by itself, unlike related art rule-based smart systems. An artificial intelligence system shows a more improved recognition rate as it is used more, and becomes capable of understanding user preference more correctly. For this reason, related art rule-based smart systems are gradually being replaced by deep learning-based artificial intelligence systems.

However, the jobs related to machine learning where a large scale of data is used as input data in a data learning process require several GPUs.

According to a related art method of allotting GPUs in a cloud providing several GPUs, a bottleneck phenomenon occurs in a network bandwidth among GPUs in a data learning process. In this case, there are problems that performance is not improved even though the number of GPUs to be used for data learning is increased, and the degree of utilization of GPUs allotted to perform data learning is low.

SUMMARY

Provided are an electronic apparatus that can reduce bottleneck phenomena in a data learning process by determining GPUs to perform data learning by using a bandwidth of available GPUs, and a method for controlling the electronic apparatus.

Additional aspects will be set forth in part in the description which follows and, in part, will be apparent from the description, or may be learned by practice of the presented embodiments.

In accordance with an aspect of the disclosure, an electronic apparatus includes a communication interface communicating with a plurality of external servers, a memory including at least one instruction, and a processor for controlling the electronic apparatus by executing the at least one instruction. The processor is configured to receive, from each of the plurality of external servers, the values of bandwidths of a plurality of GPU pairs, into which a plurality of GPUs included in the plurality of external servers are combined, and information on whether the plurality of GPUs are used, through the communication interface, and based on a job related to machine learning being input, identify the number of GPUs and a bandwidth value required for performing a plurality of tasks included in the input job, determine a plurality of GPUs for performing each of the plurality of tasks based on the values of the bandwidths of the plurality of GPU pairs, the received information on whether the plurality of GPUs are used, and the identified number of GPUs and bandwidth value required for performing the plurality of tasks, and control the communication interface to transmit learning data related to the plurality of tasks to the plurality of determined GPUs.

In accordance with an aspect of the disclosure, a method for controlling an electronic apparatus includes receiving, from each of the plurality of external servers, the values of bandwidths of a plurality of GPU pairs into which a plurality of GPUs included in a plurality of external servers are combined and information on whether the plurality of GPUs are used, and based on a job related to machine learning being input, identifying the number of GPUs and a bandwidth value required for performing a plurality of tasks included in the input job, determining a plurality of GPUs for performing each of the plurality of tasks based on the values of the bandwidths of the plurality of GPU pairs, the received information on whether the plurality of GPUs are used, and the identified number of GPUs and bandwidth value required for performing the plurality of tasks, and transmitting learning data related to the plurality of tasks to the plurality of determined GPUs.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating an available bandwidth according to the kind of a communication or network technology that an electronic apparatus acquired according to an embodiment;

FIG. 5 is a diagram for illustrating an operation of an electronic apparatus of acquiring a bandwidth required for a machine learning job according to an embodiment;

FIG. 10 is a flow chart for illustrating an operation of an electronic apparatus of allotting GPUs according to an embodiment.

DETAILED DESCRIPTION

First, terms used in this specification will be described briefly, and then embodiments will be described in detail.

As terms used herein, general terms that are currently used widely were selected as far as possible, in consideration of the functions described. However, the terms may vary depending on the intention of those skilled in the art who work in the pertinent field, previous court decisions, or emergence of new technologies. Also, in particular cases, there may be terms that were designated by the applicant, and in such cases, the meaning of the terms will be described in detail in the relevant description. Thus, the terms used herein should be defined based on the meaning of the terms and the overall content described herein, but not just based on the names of the terms.

Various modifications may be made to embodiments. Accordingly, although certain embodiments are described in detail in the detailed description, embodiments are not limited thereto and various modifications, equivalents, or alternatives may be applicable.

Terms such as "first," "second" and the like may be used to describe various elements, but the terms are not intended to limit the elements. Such terms are used only to distinguish one element from another element.

Singular expressions include plural expressions, as long as they do not obviously mean differently in the context. In addition, terms such as "include" and "consist of" should be construed as designating that there are such characteristics, numbers, steps, operations, elements, components, or a combination thereof described in the specification, but not to exclude in advance the existence or possibility of adding one or more of other characteristics, numbers, steps, operations, elements, components, or a combination thereof.

In embodiments, 'a module' or 'a part' performs at least one function or operation, and may be implemented as hardware or software, or as a combination of hardware and software. Also, a plurality of 'modules' or 'parts' may be integrated into at least one module and implemented as at least one processor, except 'modules' or 'parts' that need to be implemented as specific hardware.

Hereinafter, certain embodiments will be described in detail with reference to the accompanying drawings.

Figure 1:
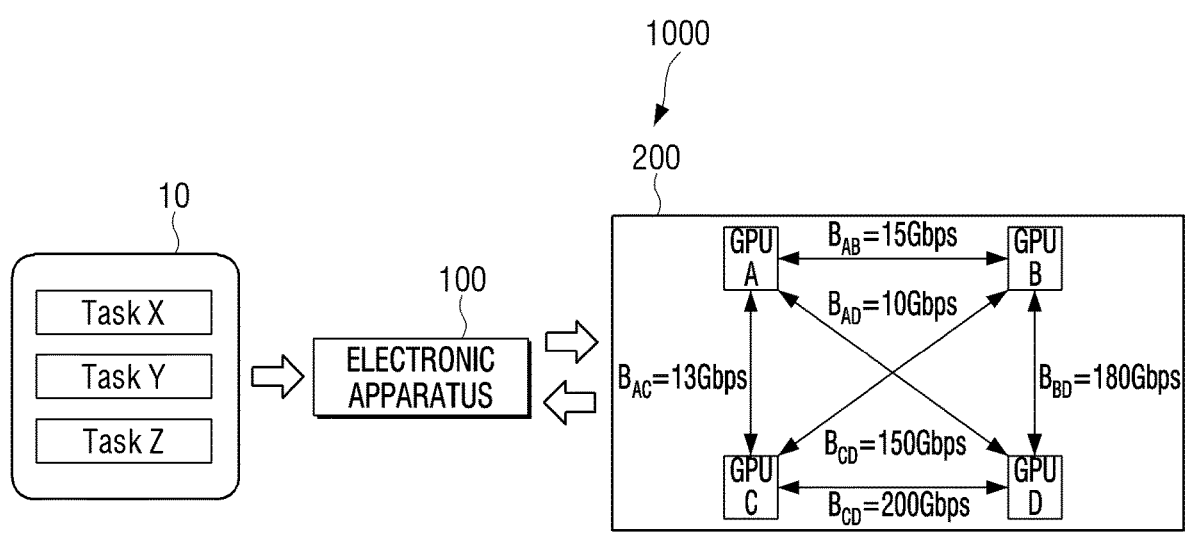
FIG. 1 is a diagram for illustrating a machine learning system according to an embodiment.

FIG. 1 is a diagram for illustrating a machine learning system according to an embodiment.

Referring to FIG. 1, the machine learning system 1000 according to an embodiment includes an electronic apparatus 100 and one or more external servers 200. An embodiment may be used in a network environment consisting of a plurality of servers including at least one GPU where network users submit a job 10, e.g., an input job, with respect to distributed machine learning (DML) requiring several GPUs to the electronic apparatus 100. That is, the job 10 input to the electronic apparatus 100 consists of a plurality of tasks, e.g., a task X, a task Y, and a task Z, for performing distributed machine learning, and each task is distributively learned through each GPU.

The electronic apparatus 100 according to an embodiment may be at least one server, but this is merely an example, and the electronic apparatus 100 may be various user terminal apparatuses such as a smartphone, a TV, a desktop PC, a tablet PC, a kiosk, etc.

The electronic apparatus 100 may determine GPUs that will perform the plurality of tasks of the input job 10.

Specifically, the electronic apparatus 100 may receive information on a plurality of available GPUs included in an external server 200 and information on the bandwidth of at least one GPU pair included in the plurality of GPUs from the external server 200 including a plurality of GPUs (e.g., a GPU A, a GPU B, a GPU C, and a GPU D). Here, the electronic apparatus 100 may periodically receive information on a plurality of available GPUs and information on the bandwidth of at least one GPU pair from the external server. However, this is merely an example, and the electronic apparatus 100 may receive information on a plurality of available GPUs and information on the bandwidth of at least one GPU pair from the external server 200 when a job request is received. Here, a GPU pair may be a pair into which a plurality of GPUs are combined as a unit of two. For example, the electronic apparatus 100 may receive information on available GPU pairs among the plurality of GPUs (e.g., a GPU A to a GPU D) and the bandwidth values of the GPU pairs from the external server 200.

Also, when a job related to machine learning is input, the electronic apparatus 100 may acquire information on the number of GPUs and a bandwidth value required for performing the plurality of tasks included in the input job 10.

In addition, the electronic apparatus 100 may determine a plurality of GPUs to perform a plurality of tasks based on information on GPUs being used and information on available bandwidths from the external server 200, and the number of GPUs and the bandwidth value required for performing the plurality of tasks included in the job.

Here, the plurality of GPUs determined to perform the plurality of tasks may be connected in the form of a ring (a unidirectional ring) transmitting data in one direction, and the plurality of GPUs may perform synchronization by transmitting data (e.g., local gradients) to adjacent GPUs on a ring topology.

A specific operation of the electronic apparatus 100 of determining a plurality of GPUs to perform the input job 10 will be described in detail with reference to FIGS. 2 to 10 below.

Figure 2:
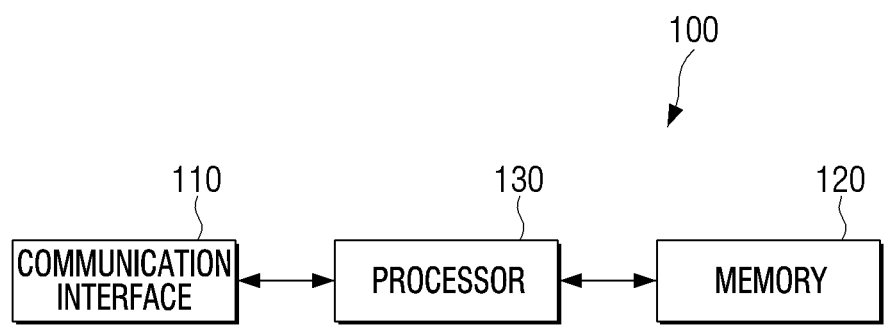
FIG. 2 is a diagram for illustrating a schematic configuration of an electronic apparatus according to an embodiment.

FIG. 2 is a diagram for illustrating a schematic configuration of an electronic apparatus according to an embodiment.

Referring to FIG. 2, the electronic apparatus 100 includes a communication interface 110, a memory 120, and a processor 130.

The communication interface 110 is a component for performing communication with an external server. Meanwhile, communicative connection of the communication interface 110 with an external server may include communication via a third apparatus (e.g., a repeater, a hub, an access point, an external server, or a gateway, etc.).

In particular, the communication interface 110 according to an embodiment may be implemented as Ethernet. The Ethernet according to an embodiment is a near field communication network (LAN) by a bus structure method, and it may transmit data by a carrier sense multiple access with collision detection (CSMA/CD) method. The electronic apparatus 100 and the plurality of external servers 200 included in the system of the disclosure may be connected through the Ethernet.

The communication interface 110 may communicate with a plurality of external servers through wired communication or wireless communication. In particular, the electronic apparatus 100 may receive information on GPUs that can perform a job related to machine learning from a plurality of external servers through wired connection or wireless connection with external servers. Specifically, information on a plurality of GPUs included in a plurality of external servers may be information on available GPUs among the plurality of GPUs and information on the values of the bandwidths of the plurality of available GPU pairs. Here, information on available GPUs may include information on whether GPUs are performing a job related to machine learning. Also, a bandwidth means a transmission rate of data of a communication system, and falls under capability to transmit data in communication between two GPUs, and may be related to the maximum transmission speed of available data in communication between two GPUs.

In addition, the bandwidth values of the plurality of available GPU pairs may mean the bandwidth values of each of the plurality of GPU pairs acquired in a unit of two GPUs that are not being used among the plurality of GPUs included in an external server. Here, a bandwidth value of a GPU pair may mean a bandwidth value between two GPUs constituting one pair.

Here, a GPU pair may be a GPU pair including a plurality of GPUs included in an external server. Such a GPU pair may be referred to as an intra-node. Here, a node may mean an external server.

A GPU pair may be a GPU pair including GPUs included in each of different external servers. For example, in a GPU pair, a GPU included in the first external server and a GPU included in the second external server may be included. Such a GPU pair may be referred to as an inter-node.

In general, a bandwidth value of an intra-node may be greater than a bandwidth value of an inter-node.

Also, the communication interface 110 may transmit learning data to an external server including GPUs allotted to perform a job related to machine learning.

The memory 120 may store various kinds of programs and data for the operations of the electronic apparatus 100. Specifically, in the memory 120, at least one instruction may be stored. The processor 130 may perform the operations of the electronic apparatus 100 by executing the instruction stored in the memory 120.

The memory 120 may be implemented as a non-volatile memory, a volatile memory, a flash-memory, a hard disc drive (HDD), or a solid state drive (SSD), etc. Further, the memory 120 may be accessed by the processor 130, and operations of reading, recording, correcting, deleting, updating, etc. of data by the processor 130 may be performed. In an embodiment, the term memory may include a memory 120, a ROM inside the processor 130, a RAM, or a memory card (e.g., a micro SD card, a memory stick) installed on the electronic apparatus 100.

In the memory 120, information on whether GPUs are used and bandwidth values of GPU pairs into which GPUs included in each external server are combined received from a plurality of external servers may be stored. Here, in the bandwidth values of GPU pairs into which the GPUs included in each external server are combined stored in the memory 120, the bandwidth values of available GPU pairs which are not being used may be included. Also, when information on whether GPUs are used and the bandwidth values of GPU pairs into which the GPUs included in each external server are combined are received periodically from a plurality of external servers through the communication interface 110, the memory 120 may periodically renew information on whether GPUs are used and the bandwidth values of GPU pairs into which the GPUs included in each external server are combined, and store them.

Also, in the memory 120, at least one of bandwidth values of GPU pairs required in an input job related to machine learning or the number of necessary GPUs may be stored.

The processor 130 may be electronically connected with the communication interface 110 and the memory 120, and control the overall operations of the electronic apparatus 100. Specifically, the processor 130 may control the overall operations of the electronic apparatus 100 by executing at least one instruction stored in the memory 120.

According to an embodiment, the processor 130 may be implemented as a digital signal processor (DSP), a microprocessor, and a time controller (TCON). However, this is not limiting, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

The processor 130 may receive values of bandwidths of a plurality of GPU pairs into which a plurality of GPUs included in a plurality of external servers are combined and information on whether the plurality of GPUs are used from each of the plurality of external servers through the communication interface 110.

Here, the values of bandwidths of GPU pairs received through the communication interface 110 are measured from each of the plurality of external servers, and may be received periodically from each of the plurality of external servers. For example, the values of bandwidths of GPU pairs may be received from the plurality of external servers based on a predetermined period, or may be received from the plurality of external servers every time a job related to machine learning is input and a GPU allotting event occurs.

A specific operation of the processor 130 of measuring available bandwidths of GPUs that can perform a job related to machine learning will be described in detail with reference to FIG. 3 below.

Also, when a job related to machine learning is input, the processor 130 may identify the number of GPUs and a bandwidth value required for performing a plurality of tasks included in the input job. Here, the number of GPUs required for performing a plurality of tasks may be related to the number of the plurality of tasks, and the bandwidth value required for performing a plurality of tasks may mean a minimum GPU bandwidth value by which a bottleneck phenomenon among GPUs does not occur when a job including the tasks is executed.

Here, the processor 130 may acquire a bandwidth value required for performing a plurality of tasks based on the various attributes of the input job. Specifically, the various attributes of the input job may be at least one of the type of the machine learning model, the size of the machine learning model, the data set, the size of the batch, or the processing performance of the processor 130. Such a specific operation of the processor 130 of acquiring a bandwidth value required for performing a plurality of tasks will be described in detail with reference to FIG. 3 below.

The processor 130 may determine a plurality of GPUs where each of the plurality of tasks will be performed based on the values of bandwidths of a plurality of GPU pairs received from the plurality of external servers, information on whether the plurality of GPUs are used (i.e., information on available GPUs) received from the plurality of external servers, and the identified number of GPUs and bandwidth value required for performing the plurality of tasks.

Here, the processor 130 may allot GPUs to perform the input job among the available GPU pairs acquired by combining the plurality of GPUs included in the plurality of external servers. In this case, the processor 130 may determine available GPU pairs by excluding the GPU pairs being used among the plurality of GPU pairs based on the information on whether GPUs are used received from the plurality of external servers.

The processor 130 may identify GPU pairs of which bandwidth values are greater than or equal to the bandwidth value required for performing a plurality of tasks, among the GPU pairs acquired by combining the plurality of GPUs included in the plurality of external servers.

Here, the processor 130 may sequentially identify GPU pairs having the smallest bandwidth values among the GPU pairs of which bandwidth values are greater than or equal to the bandwidth value required for performing a plurality of tasks, based on the number of GPUs required for performing the plurality of tasks included in the input job. For example, if the number of GPUs required for performing the plurality of tasks is three, and the bandwidth value of GPU pairs required for performing the tasks is 100 Gbps, the processor 130 may identify GPU pairs of which bandwidth values are greater than or equal to 100 Gbps, among the GPU pairs acquired by combining the plurality of GPUs included in the plurality of external servers. The processor 130 may identify three GPU pairs having the smallest bandwidth values among the GPU pairs of which bandwidth values are greater than or equal to 100 Gbps, for example, by sequentially identifying three GPU pairs starting with the GPU pair having the smallest bandwidth value. The processor 130 may determine the GPUs included in the three identified GPU pairs as GPUs that will perform each of the three tasks.

As another example, the processor 130 may acquire a plurality of groups including at least one GPU pair by combining available GPU pairs based on the number of GPUs required for performing a plurality of tasks included in an input job. For example, if the number of GPUs included in a network is four, and the number of GPUs required for performing a plurality of tasks is two, the processor 130 may acquire six groups in total where GPUs are combined in a unit of two. Here, in each group, one GPU pair may be included. As still another example, if the number of GPUs included in a network is four, and the number of GPUs required for performing a plurality of tasks is three, the processor 130 may acquire four groups where GPUs are combined in a unit of three. Here, in each group, three GPU pairs may be included.

The processor 130 may determine one group among the plurality of groups acquired based on a predefined policy. The processor 130 may determine GPUs included in the determined group as GPUs that will perform each of the plurality of tasks.

Here, the predefined policy may be a standard for determining GPU pairs to perform a plurality of tasks, when there are several GPU pairs satisfying a condition for performing a plurality of tasks among a plurality of GPU pairs, or when there is no GPU pair satisfying the condition. Such a predefined policy may have been stored in the memory 120 before performing a job related to machine learning, and it may have been set by the manufacturer during the manufacturing process of the electronic apparatus 100, or may have been set by a user.

As an example, the processor 130 may identify a group of which minimum bandwidth is the smallest among the groups of which minimum bandwidth values of GPU pairs included in the groups are greater than the bandwidth value required for performing a plurality of tasks, based on a predefined policy. The processor 130 may determine a plurality of GPUs included in the identified group as a plurality of GPUs to perform each of the plurality of tasks.

If there is no group of which minimum bandwidth value of GPU pairs is greater than the bandwidth value required for performing a plurality of tasks, the processor 130 may identify a group of which minimum bandwidth value of GPU pairs is the greatest based on a predefined policy, and determine a plurality of GPUs included in the identified group as a plurality of GPUs to perform each of the plurality of tasks.

As another example, if there is no group of which minimum bandwidth value of GPU pairs is greater than the bandwidth value required for performing a plurality of tasks, the processor 130 may reacquire groups of GPU pairs until a group of which minimum bandwidth value of GPU pairs is greater than the bandwidth value required for performing a plurality of tasks is acquired, based on a predefined policy.

A policy of determining GPU pairs to perform tasks of an input job will be described in more detail with reference to FIG. 10 below.

Local gradients may be acquired for each GPU by respectively inputting learning data to a plurality of GPUs determined to perform tasks, and each of the acquired local gradients may be mutually synchronized. Here, a local gradient means the degree of change of parameters included in GPUs based on learning data input to the GPUs, and the parameters included in the GPUs are learned based on the synchronized local gradients.

Here, synchronized local gradients may be the average value of the local gradients acquired in each GPU. In this case, each GPU may synchronize local gradients through broadcast, scatter, gather, reduce, and all-reduce methods. In particular, the all-reduce method has an advantage of using bandwidths effectively compared to a method of synchronizing local gradients through an external server of parameters in the center during distributive deep learning.

The aforementioned operation of mutually synchronizing a plurality of GPUs will be described in more detail with reference to FIG. 8 below.

Figure 3:
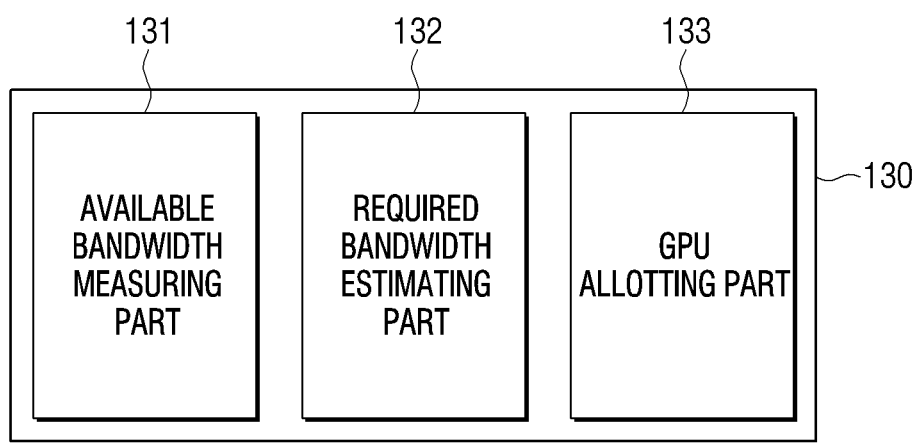
FIG. 3 is a diagram for illustrating in more detail an operation of a processor of an electronic apparatus according to an embodiment.

FIG. 3 is a diagram for illustrating in more detail an operation of a processor of an electronic apparatus according to an embodiment.

Referring to FIG. 3, the processor 130 may include an available bandwidth measuring part 131, a required bandwidth estimating part 132, and a GPU allotting part 133. Here, each of the available bandwidth measuring part 131, the required bandwidth estimating part 132, and the GPU allotting part 133 may be implemented as a software module or may be in the form of at least one hardware chip.

The available bandwidth measuring part 131 is a component measuring bandwidth values of available GPU pairs for determining GPU pairs that can perform tasks included in a job, in case a job related to machine learning is input. The available bandwidth measuring part 131 may periodically measure the values of bandwidths of GPU pairs acquired by combining two or more of all GPUs included in a plurality of external servers. Specifically, the available bandwidth measuring part 131 may periodically receive values of bandwidths of GPU pairs from a plurality of external servers and calculate available bandwidth values of the GPU pairs.

For example, the available bandwidth measuring part 131 may measure actual values of bandwidths of GPU pairs through a bandwidth measurement application programming interface (API) included in a plurality of external servers (e.g., a virtual or physical machine) in a cloud. As another example, the available bandwidth measuring part 131 may measure available bandwidth values by a method of subtracting the sum of bandwidths required by a machine learning job being performed from all GPU pairs acquired by combining two or more of all GPUs included in a plurality of external servers.

As illustrated in FIG. 4, the available bandwidths acquired by the available bandwidth measuring part 131 may vary according to the types of communication/network technologies connecting GPU pairs in a cloud environment. Also, the available bandwidths (link capacity) acquired by the available bandwidth measuring part 131 may vary according to the state of sharing network bandwidths with another traffic. In general, bandwidth values of an intra-node are greater than the bandwidth values of an inter-node.

The required bandwidth estimating part 132 is a component acquiring the number of GPUs and the minimum bandwidth of GPUs required such that a bottleneck phenomenon does not occur when a job related to machine learning is performed by using a plurality of GPUs, in case a job related to machine learning is input.

Here, the required bandwidth estimating part 132 may determine the required number of GPUs and the required bandwidth of GPUs based on at least one attribute among the type of the learning model, the size of the learning model, the data set, the size of the batch, and the processing performance according to the model of the processor.

When a job related to machine learning is input, a template related to the job may be provided, as illustrated in FIG. 5. In the template related to the job, a field related to the required number of GPUs (gpus), a field related to the required bandwidths (interGPUbandwidth), a field indicating whether to allow a best-effort method in case there are no GPUs satisfying the minimum bandwidth value (besteffortallowed), etc. may be included.

Here, in case the required number of GPUs and the required bandwidth in the input job are specified in the template related to the job, the required bandwidth estimating part 132 may acquire the specified number of GPUs and bandwidth value. Referring to FIG. 5, the required bandwidth estimating part 132 may acquire the number of GPUs required for performing a job as 16, and the required bandwidth value as 1000 Mbps.

In case a job related to machine learning where a required bandwidth value is not specified is input, the required bandwidth estimating part 132 may calculate estimated values of the required number of GPUs and the required bandwidth value based on the attributes of the input job related to machine learning. Specifically, the required bandwidth estimating part 132 may estimate the required number of GPUs and the required bandwidth of GPUs based on at least one attribute among the type of the learning model, the size of the learning model, the data set, the size of the batch, and the processing performance according to the model of the processor.

As another example, the required bandwidth estimating part 132 may store the required number of GPUs and the required bandwidth values of jobs related to machine learning performed previously in the memory, and estimate the number of GPUs and the bandwidth value of a job similar to the input job related to machine learning among the stored number of GPUs and bandwidth values as the required number of GPUs and the required bandwidth value of the input related to machine learning.

The GPU allotting part 133 is a component allotting GPUs for performing an input job among GPUs included in a plurality of external servers, based on bandwidth values of GPU pairs acquired at the available bandwidth measuring part 131 and the required number of GPUs and the required bandwidth value for performing the job acquired at the required bandwidth estimating part 132.

The GPU allotting part 133 may acquire GPU pair groups by combining GPU pairs acquired by combining all GPUs included in a plurality of external servers. Here, the GPU allotting part 133 may acquire a plurality of groups such that each of the plurality of groups includes the required number of GPUs based on the number of GPUs acquired at the required bandwidth estimating part 132.

The GPU allotting part 133 may select groups of which available bandwidth values are greater than or equal to the required bandwidth value among the plurality of acquired groups as candidate groups. Here, the GPU allotting part 133 may select groups of which minimum bandwidth values of GPU pairs included in the groups are greater than the required bandwidth as candidate groups. That is, the GPU allotting part 133 may select GPU pair groups of which available bandwidths are sufficient such that a bottleneck phenomenon does not occur in the synchronization process of local gradients among GPUs.

The GPU allotting part 133 may select one group according to a predefined policy among the selected candidate groups and allot tasks included in an input job to each of a plurality of GPUs included in the group. Here, the GPU allotting part 133 may allot each task to each of the GPUs in consideration of the required bandwidth value among the tasks and the bandwidth values among the GPUs.

If there is no group of which available bandwidth values are greater than or equal to the required bandwidth value among the plurality of acquired groups, the GPU allotting part 133 may select a group of which minimum bandwidth of GPU pairs is the greatest among the plurality of groups according to a best-effort method based on a predefined policy, or acquire available bandwidth values from the available bandwidth measuring part 131 until a group of which available bandwidth values are greater than or equal to the required bandwidth value is acquired.

As an example, whether to select a group based on a best-effort method, or to acquire available bandwidth values from the available bandwidth measuring part 131 until a group of which available bandwidth values are greater than or equal to the required bandwidth value is acquired may be determined based on information specified in an input job such as "besteffortallowed:false" as illustrated in FIG. 5. For example, in case information is specified as "besteffortallowed:false," the GPU allotting part 133 may acquire available bandwidth values from the available bandwidth measuring part 131 until a group of which available bandwidth values are greater than or equal to the required bandwidth value is acquired. In case information is specified as "besteffortallowed:true," the GPU allotting part 133 may select a group of which minimum bandwidth of GPU pairs is the greatest among a plurality of groups according to a best-effort method. Such a method of allotting GPUs will be described in more detail with reference to FIG. 10 below.

Figure 6:
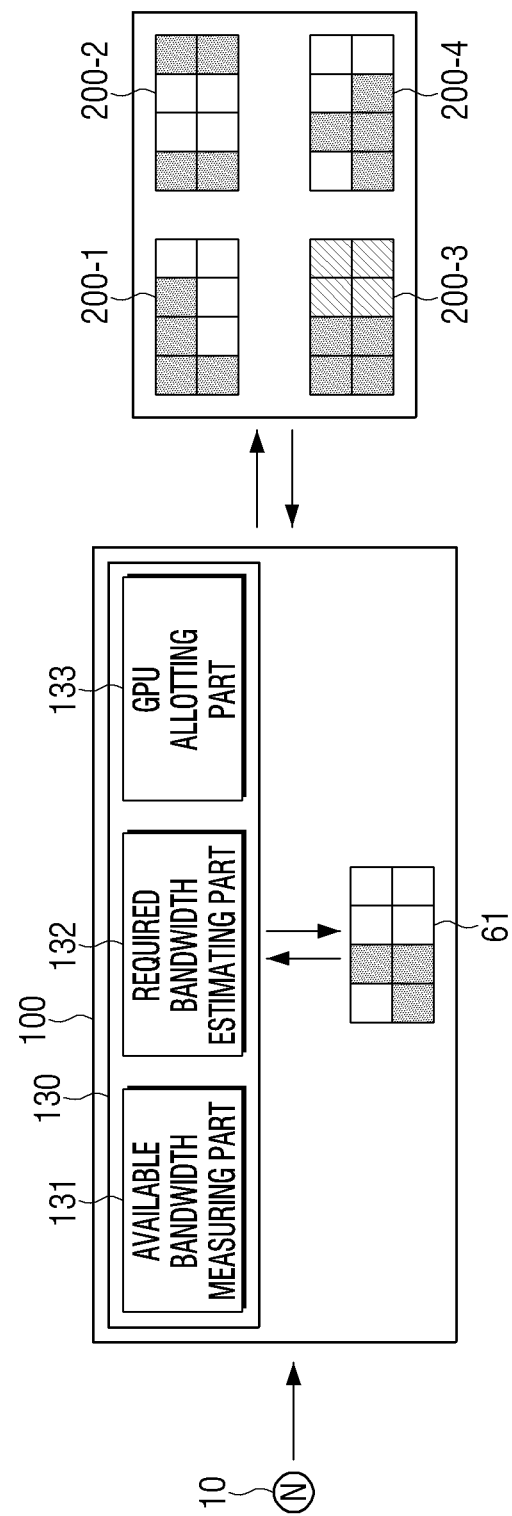
FIG. 6 is a diagram for illustrating an example of a GPU allotting method in case GPUs are included in an electronic apparatus according to an embodiment.

FIG. 6 is a diagram for illustrating an example of a GPU allotting method in case GPUs are included in an electronic apparatus.

Referring to FIG. 6, the electronic apparatus 100 includes a processor 130 and a plurality of GPUs 61. For the convenience of explanation, a communication interface and a memory were omitted in FIG. 6, and the available bandwidth measuring part 131, the required bandwidth estimating part 132, and the GPU allotting part 133 of the processor 130 of the electronic apparatus 100 illustrated in FIG. 6 are substantially identical to the components in FIG. 3, and thus overlapping explanation will be omitted.

The available bandwidth measuring part 131 may measure available bandwidths by determining whether GPUs are used and using the bandwidth values of GPU pairs received from a plurality of external servers 200-1, 200-2, 200-3, and 200-4 respectively including a plurality of GPUs. Here, in case a plurality of GPUs 61 are included in the electronic apparatus 100, the available bandwidth measuring part 131 may measure whether the plurality of GPUs 61 included in the electronic apparatus 100 are used and the bandwidth values among the GPU pairs.

For example, referring to FIG. 6, among the eight GPUs included in the first external server 200-1, the first GPU, the second GPU, the third GPU, and the fifth GPU are being used as shown by the shaded squares, and among the eight GPUs included in the second external server 200-2, the first GPU, the fourth GPU, the fifth GPU, and the eighth GPU are being used. The available bandwidth measuring part 131 may receive information on GPUs being used from each external server, and acquire information on GPUs being used among the GPUs included in the electronic apparatus 100. Also, the available bandwidth measuring part 131 may receive bandwidth values of all GPU pairs into which available GPUs are combined from a plurality of external servers, or measure the bandwidth values through a bandwidth measuring API included in the electronic apparatus 100.

Figure 7:
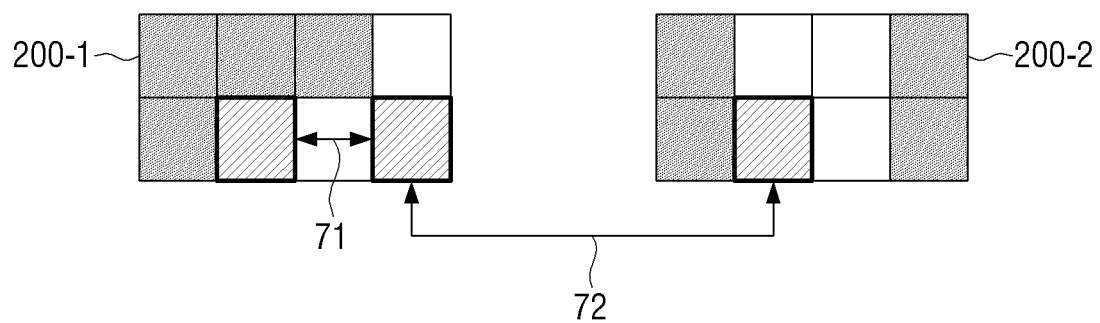
FIG. 7 is a diagram for illustrating various allotting methods of GPUs according to an embodiment.

Here, a GPU pair may include two GPUs included in one external server (e.g., the GPU pair 71 including the sixth GPU and the eighth GPU of the first external server 200-1, as illustrated in FIG. 7, and it may be referred to as an intra-node), or include GPUs respectively included in different external servers (e.g., the GPU pair 72 including the eighth GPU of the first external server 200-1 and the sixth GPU of the second external server 200-2, as illustrated in FIG. 7, and it may be referred to as an inter-node).

The required bandwidth estimating part 132 may estimate the number of necessary GPUs and the required bandwidth value for performing a job 10, if a job 10 related to machine learning is input.

The GPU allotting part 133 may determine a plurality of GPUs for performing an input job 10 among a plurality of GPUs included in the plurality of external servers 200-1 to 200-4 and a plurality of GPUs 61 included in the electronic apparatus 100 based on the bandwidth values acquired at the available bandwidth measuring part 131 and the number of GPUs and the minimum bandwidth value acquired at the required bandwidth estimating part 132.

In FIG. 6, it is illustrated that the plurality of external servers 200-1 to 200-4 and the electronic apparatus 100 respectively include eight GPUs, but the number of GPUs is not limited thereto.

Figure 8:
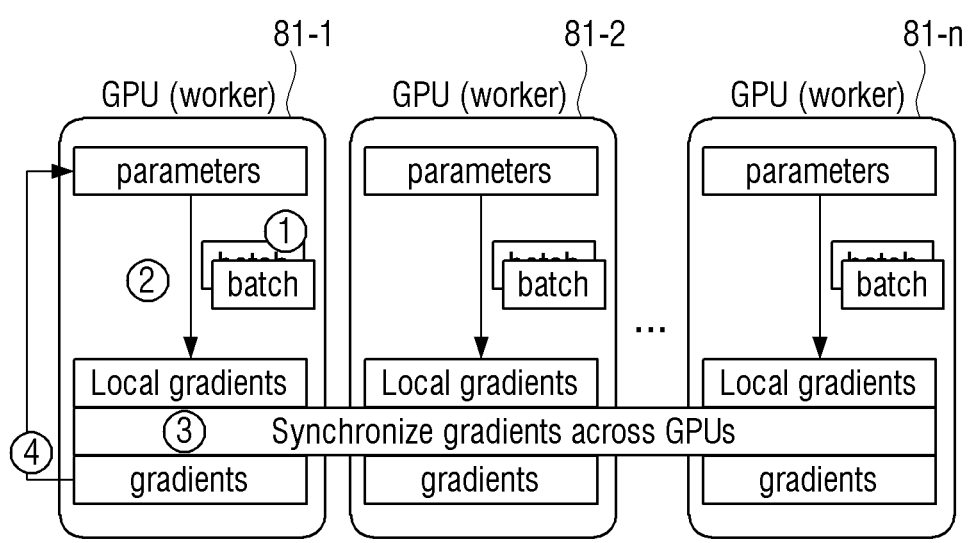
FIG. 8 is a diagram for illustrating an operation of synchronizing local gradients among allotted GPUs according to an embodiment.

FIG. 8 is a diagram for illustrating an operation of synchronizing local gradients among allotted GPUs.

Referring to FIG. 8, the GPUs 81-1 and 82-1 to 81-$n$ determined by the electronic apparatus may perform learning by using parameters included in each GPU. Specifically, batches which are data units allotting learning data of an input job are input ① in each of the GPUs 81-1 to 81-$n$, and each of the determined GPUs 81-1 to 81-$n$ may acquire ② local gradients for updating parameters by using the input batches. Here, local gradients may mean the degree of change of parameters.

The local gradients acquired at each of the GPUs 81-1 to 81-$n$ may be mutually synchronized ③. Specifically, the local gradients may be synchronized through a collective communication method. Here, a collective communication method refers to a communication method among GPUs in a distributive processing environment, and may mean a method of performing communication among GPUs without an external server of parameters in the center. As types of collective communication, there are broadcast, scatter, gather, reduce, all-reduce, etc., and they have an advantage of using bandwidths effectively compared to a method of synchronizing gradients through an external server of parameters in the center.

A representative example of collective communication methods is a ring all-reduce method, and in this method, GPUs are connected in the form of a ring (unidirectional ring) transmitting data in one direction, and each GPU performs synchronization of local gradients by transmitting data to adjacent GPUs on a ring topology.

In the process of synchronizing local gradients among GPUs ③, network bandwidths among GPUs are consumed, and if GPUs are not appropriately selected, a bottleneck phenomenon among GPUs may occur in the process of synchronizing local gradients, and accordingly, increase of learning time and decrease of efficiency of resources may occur. However, according to an embodiment, GPUs for performing a job related to machine learning are allotted based on available bandwidth values and the number of GPUs and the minimum bandwidth value required for performing the job, and thus a bottleneck phenomenon that may occur in a synchronization process may be minimized.

Then, each of the determined GPUs 81-1 to 81-$n$ may update ④ parameters by reflecting the synchronized gradients.

Figure 9:
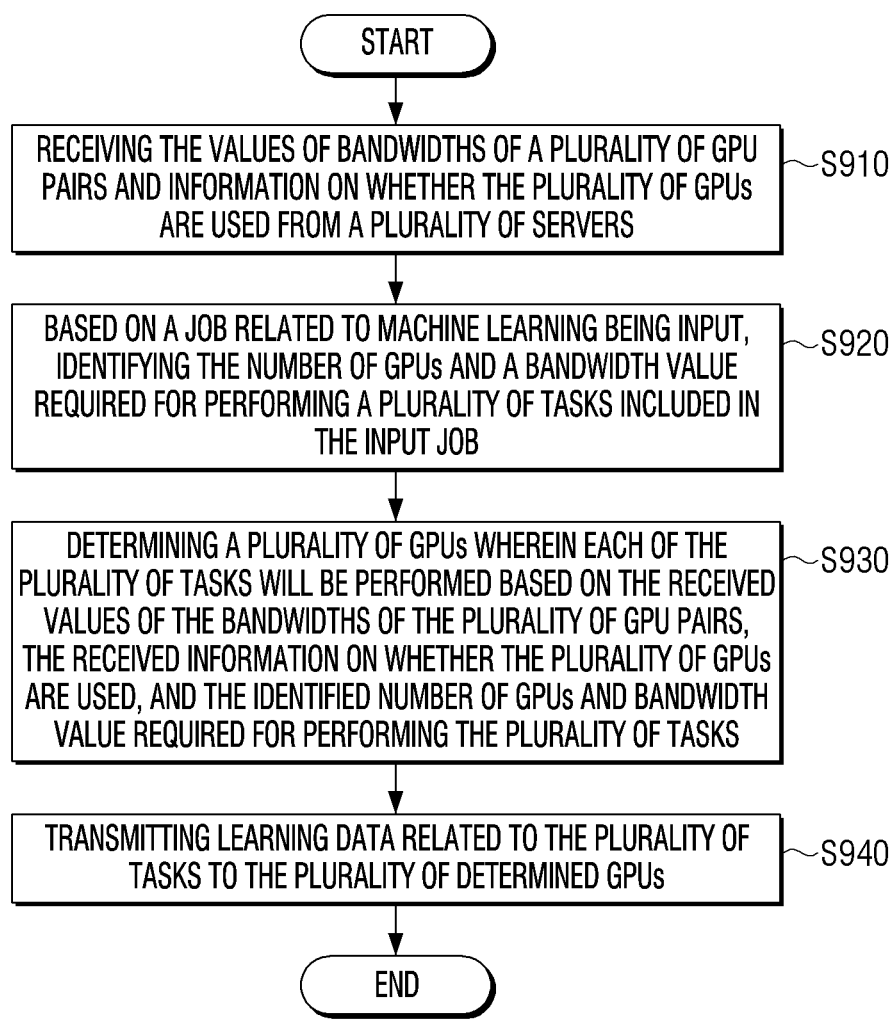
FIG. 9 is a flow chart for illustrating a controlling method of an electronic apparatus according to an embodiment.

FIG. 9 is a flow chart for illustrating a controlling method of an electronic apparatus according to an embodiment.

Referring to FIG. 9, the electronic apparatus may receive values of bandwidths of a plurality of GPU pairs and information on whether the plurality of GPUs are used from each of a plurality of external servers at operation S910. Here, the values of bandwidths of GPU pairs received from a plurality of external servers may have been directly measured from bandwidth measuring APIs included in each external server, or may be measured by a method of subtracting the sum of required bandwidth values of a job using GPU pairs from the bandwidth values of the GPU pairs.

When a job related to machine learning is input, the electronic apparatus may identify the number of GPUs and the bandwidth value required for performing a plurality of tasks included in the input job at operation S920. Here, the number of GPUs necessary for performing the input job may correspond to the number of the tasks.

The electronic apparatus may acquire the number of GPUs and the minimum bandwidth value necessary for performing a job based on the attributes of the job. For example, the electronic apparatus may acquire the number of GPUs and the bandwidth value required for performing a job based on at least one of the type of the learning model, the size of the learning model, the data set, the batch size, or the processing performance of the processor.

As an example, the electronic apparatus may acquire the number of GPUs and the minimum bandwidth value based on information specified in a template related to a job that is provided when a job is input. As another example, the electronic apparatus may store the number of GPUs and the minimum bandwidth values of jobs performed previously, and select the number of GPUs and the minimum bandwidth value of a job similar to the input job among the stored number of GPUs and minimum bandwidth values.

In FIG. 9, it is illustrated that required bandwidths are estimated after available bandwidths are measured, but the order is not limited thereto.

The electronic apparatus may determine a plurality of GPUs where each of a plurality of tasks will be performed based on the received values of bandwidths of a plurality of GPU pairs, the received information on whether the plurality of GPUs are used, and the number of GPUs and the bandwidth value required for performing the plurality of tasks at operation S930.

Here, the electronic apparatus may determine GPU pairs that will allot the tasks based on bandwidth values among the plurality of tasks and the bandwidth values of the GPU pairs, and determine that the plurality of GPUs included in the GPU pairs are a plurality of GPUs to perform the tasks.

The electronic apparatus may transmit learning data related to the plurality of tasks to the plurality of determined GPUs, in operation S940. Here, the learning data transmitted to each of the GPUs may be batches that allotted learning data.

FIG. 10 is a flow chart for illustrating an operation of an electronic apparatus of allotting GPUs according to an embodiment.

Referring to FIG. 10, first, the electronic apparatus may receive input of a job related to machine learning at operation S1010. The electronic apparatus may determine the bandwidth value of GPU pairs and the number of GPUs required for performing the input job at operation S1020.

The electronic apparatus may acquire bandwidth values of available GPU pairs among a plurality of GPUs included in a plurality of external servers at operation S1030. The electronic apparatus may acquire groups of GPU pairs based on the required number of GPUs at operation S1040. Specifically, the electronic apparatus may acquire a plurality of groups into which GPU pairs are combined based on the required number of GPUs in the input job among all available GPU pairs.

The electronic apparatus may identify groups of which minimum bandwidth values of GPU pairs are greater than or equal to the required bandwidth value of GPU pairs among the plurality of groups at operation S1050. For example, if three GPU pairs are included in each group, the electronic apparatus may identify groups of which minimum bandwidth value among three bandwidth values is greater than or equal to the bandwidth value required for performing a job among the plurality of groups.

Here, if there is a group of which minimum bandwidth value is greater than or equal to the required bandwidth value (operation S1060-Y), the electronic apparatus may determine one group among the plurality of groups based on a predefined policy at operation S1070. Here, the predefined policy may be a standard for determining GPU pairs to perform a plurality of tasks, when there are several GPU pairs satisfying a condition for performing a plurality of tasks among a plurality of GPU pairs, or when there is no GPU pair satisfying the condition. Such a predefined policy may have been stored in the memory before performing a job related to machine learning, and it may have been set by the manufacturer during the manufacturing process of the electronic apparatus, or may have been set by a user.

As an example, the electronic apparatus may identify a group of which minimum bandwidth is the smallest among the groups of which minimum bandwidth values of GPU pairs included in the groups are greater than the bandwidth value required for performing a plurality of tasks, based on a predefined policy, and determine the GPU pairs included in the identified group as a plurality of GPUs to perform each of the plurality of tasks.

If there is no group of which minimum bandwidth value is greater than or equal to the required bandwidth value (operation S1060-N), the electronic apparatus may determine whether a best-effort method is allowed (besteffortallowed) at operation S1080. Here, if a best-effort method is allowed (besteffortallowed=true) (operation S1080-Y), the electronic apparatus may select a group of which minimum bandwidth value of GPU pairs is the greatest at operation S1090.

If a best-effort method is not allowed (besteffortallowed=false) (operation S1080-N), the electronic apparatus may return to the operation S1030 of acquiring bandwidth values of available GPU pairs from a plurality of external servers, and repeat the operations S1030 to S1050 until a group of which minimum bandwidth value is greater than the required bandwidth value is acquired.

According to the above-described various embodiments, GPUs are allotted based on bandwidth values of available GPUs and a bandwidth value required in a job, and accordingly, a bottleneck phenomenon that may occur during a synchronization process of local gradients can be minimized. Accordingly, time spent for a machine learning process can be reduced, and resources can be used effectively.

The above-described various embodiments may be implemented by using a recording medium that can be read by a computer or an apparatus similar to a computer, by using software, hardware, or a combination thereof. According to implementation by hardware, embodiments may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions. In some cases, the embodiments described in this specification may be implemented as the processor itself. According to implementation by software, the embodiments such as procedures and functions described in this specification may be implemented as separate software modules. Each of the software modules may perform one or more functions and operations described in this specification.

The software to execute the methods according to above-described embodiments may be stored in a non-transitory computer-readable medium. Such a non-transitory computer-readable medium may be used while being mounted on various apparatuses.

Anon-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer-readable medium such as a CD, a DVD, a hard disc, a blue-ray disc, a USB, a memory card, a ROM and the like.

Also, the methods according to embodiments described herein may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., Google Play'). In the case of on-line distribution, at least a portion of a computer program product may be stored in a storage medium such as the external server of the manufacturer, the external server of the application store, and the memory of the external relay server at least temporarily, or may be generated temporarily.

While certain embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic apparatus comprising:
a communication interface configured to communicate with a plurality of external servers comprising a plurality of graphics processing units (GPUs);
a memory comprising at least one instruction; and a processor configured to control the electronic apparatus by executing the at least one instruction,
wherein the processor is further configured to:
receive, through the communication interface from the plurality of external servers, values of bandwidths of a plurality of GPU pairs, respectively, into which the plurality of GPUs are combined, and information on whether the plurality of GPUs are used,
based on an input job related to machine learning being received, identify a number of GPUs and a bandwidth value that are required for performing a plurality of tasks included in the input job,
determine GPUs among the plurality of GPUs to perform the plurality of tasks based on the values of the bandwidths of the plurality of GPU pairs, the received information on whether the plurality of GPUs are used, and the number of GPUs and the bandwidth value that are required for performing the plurality of tasks,
control the communication interface to transmit learning data, related to the plurality of tasks, to the determined GPUs,
acquire a plurality of groups including at least one GPU pair, by combining available GPU pairs based on the number of GPUs that are required and the bandwidth value that is required,
determine one of the plurality of groups based on a predefined policy, and
determine a plurality of GPUs included in the determined one of the plurality of groups as a plurality of GPUs to perform each of the plurality of tasks, and
wherein the predefined policy comprises determining a plurality of GPUs included in a group of which a minimum bandwidth value is the smallest among groups of which minimum bandwidth values are greater than the bandwidth value required for performing the plurality of tasks as a plurality of GPUs to perform each of the plurality of tasks; and
wherein at least one of the plurality of tasks is executed by at least one of the determined plurality of GPUs.

2. The electronic apparatus of claim 1, wherein the processor is further configured to:
in an absence of a group of which a bandwidth value of at least one available GPU pair is greater than or equal to the bandwidth value required for performing the plurality of tasks among the plurality of groups, determine the GPUs included in a group of which a value of the bandwidth of the at least one available GPU pair included therein is the greatest among the plurality of groups, as the GPUs to perform the plurality of tasks.

3. The electronic apparatus of claim 1, wherein the processor is further configured to:
identify candidate GPU pairs of which the values of the bandwidths are greater than or equal to the identified bandwidth value required for performing the plurality of tasks, among the plurality of GPU pairs,
based on an order of the values of the bandwidths and the number of GPUs required for performing the input job, sequentially identify GPU pairs having smallest bandwidth values among the candidate GPU pairs, and
determine GPUs included in the GPU pairs as the GPUs to perform the plurality of tasks, respectively.

4. The electronic apparatus of claim 1, wherein the plurality of GPU pairs include a first GPU pair including a first plurality of GPUs included in an external server and a second GPU pair including a second plurality of GPUs included in external servers different from each other, among the plurality of external servers.

5. The electronic apparatus of claim 1, wherein the processor is further configured to determine available bandwidth based on the receiving the values of the bandwidths of the plurality of GPU pairs measured by the plurality of external servers, and wherein the values of the bandwidths are periodically received from the plurality of external servers through the communication interface.

6. The electronic apparatus of claim 1, wherein the memory is configured to store information on a value of a bandwidth of a GPU pair being used among the plurality of GPU pairs, and
wherein the processor is further configured to:
determine GPUs to perform the input job among the plurality of GPU pairs by excluding the GPU pair being used.

7. The electronic apparatus of claim 1, wherein a plurality of local gradients acquired by inputting the learning data to each of the determined GPUs are mutually synchronized, the plurality of local gradients indicating a degree of change of parameters included in the determined GPUs based on the learning data.

8. The electronic apparatus of claim 7, wherein the parameters included in the determined GPUs are trained based on the synchronized plurality of local gradients.

9. A method for controlling an electronic apparatus, the method comprising:
receiving, from a plurality of external servers including a plurality of graphics processing units (GPUs), values of bandwidths of a plurality of GPU pairs, respectively, into which the plurality of GPUs are combined, and information on whether the plurality of GPUs are used;
based on an input job related to machine learning being received, identifying a number of GPUs and a bandwidth value that are required for performing a plurality of tasks included in the input job;
determining GPUs among the plurality of GPUs for performing the plurality of tasks, based on the values of the bandwidths of the plurality of GPU pairs, the received information on whether the plurality of GPUs are used, and the number of GPUs and the bandwidth value that are required for performing the plurality of tasks; and
transmitting learning data related to the plurality of tasks to the determined GPUs, wherein the determining the GPUs among the plurality of GPUs for performing the plurality of tasks further comprises:
acquiring a plurality of groups including at least one GPU pair, by combining available GPU pairs based on the number of GPUs that are required and the bandwidth value that is required;
determining one of the plurality of groups based on a predefined policy; and
determining a plurality of GPUs included in the determined one of the plurality of groups as a plurality of GPUs to perform each of the plurality of tasks,
wherein the predefined policy comprises determining a plurality of GPUs included in a group of which a minimum bandwidth is the smallest among groups of which minimum bandwidth values are greater than the bandwidth value required for performing the plurality of tasks as a plurality of GPUs to perform each of the plurality of tasks; and wherein at least one of the plurality of tasks is executed by at least one of the determined plurality of GPUs.

10. The method of claim 9, wherein the determining the GPUs further comprises:

in an absence of a group of which a bandwidth value of at least one available GPU pair is greater than or equal to the bandwidth value required for performing the plurality of tasks among the plurality of groups, determining the GPUs included in a group of which a value of the bandwidth of the at least one available GPU pair included therein is the greatest among the plurality of groups, as the GPUs to perform the plurality of tasks.

11. The method of claim 9, wherein the determining the GPUs further comprises:

identifying candidate GPU pairs of which the values of the bandwidths are greater than or equal to the identified bandwidth value required for performing the plurality of tasks, among the plurality of GPU pairs;

based on an order of the values of the bandwidths and the number of GPUs required for performing the input job, sequentially identifying GPU pairs having smallest bandwidth values among the candidate GPU pairs; and determining GPUs included in the GPU pairs as the GPUs to perform the plurality of tasks, respectively.

12. The method claim 9, wherein the plurality of GPU pairs include a first GPU pair including a first plurality of GPUs included in an external server and a second GPU pair including a second plurality of GPUs included in external servers different from each other, among the plurality of external servers.

13. The method of claim 9, wherein the received values of the bandwidths of the plurality of GPU pairs are measured by each of the plurality of external servers, and are periodically received from the plurality of external servers.

14. The method of claim 9, further comprising:

storing information on a bandwidth of a GPU pair being used among the plurality of GPU pairs, wherein the determining the GPUs further comprises:

determining GPUs to perform the input job among the plurality of GPU pairs by excluding the GPU pair being used.

15. The method of claim 9, wherein a plurality of local gradients acquired by inputting the learning data to each of the determined GPUs are mutually synchronized, the plurality of local gradients indicating a degree of change of parameters included in the determined GPUs based on the learning data.

16. The method of claim 15, wherein the parameters included in the determined GPUs are trained based on the synchronized plurality of local gradients.

* * * * *